5 Sheets—Sheet 1.
J. H. YOUNG & A. DELCAMBRE.
TYPE SETTER.
No. 2,139. Patented June 22, 1841.
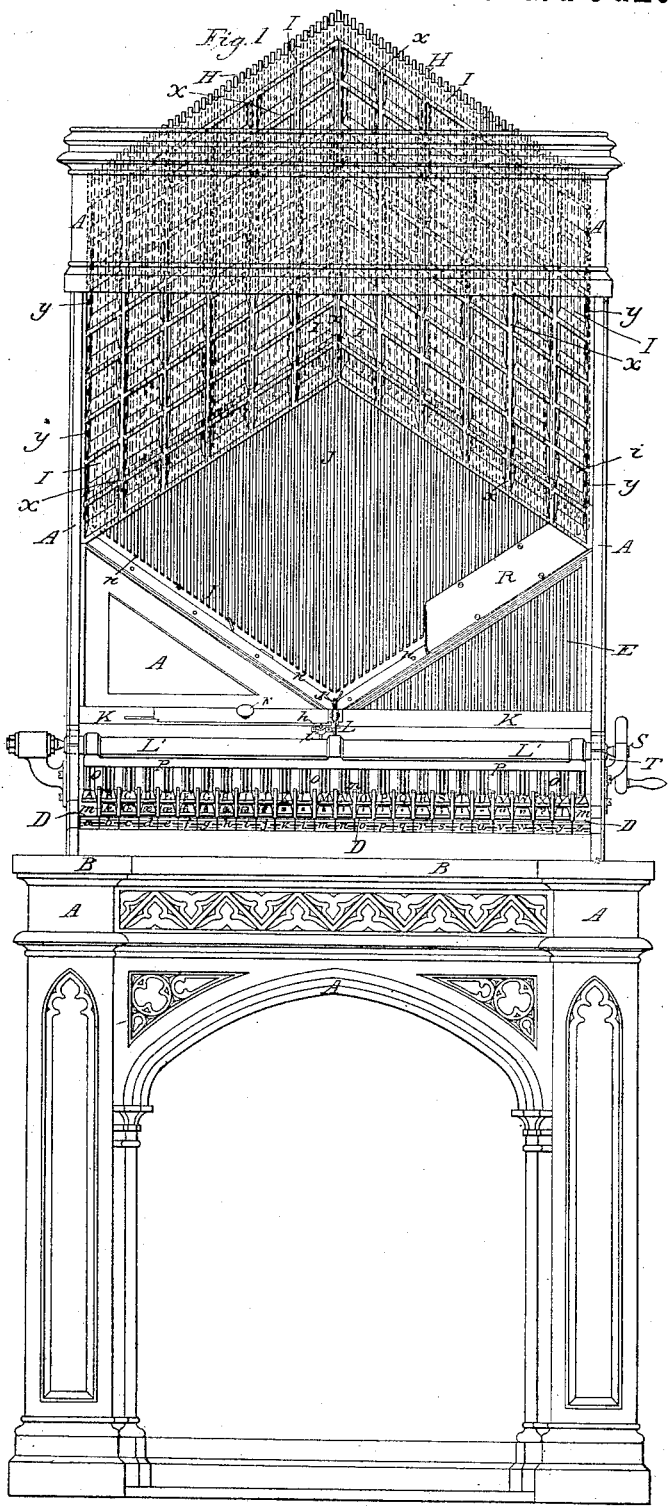

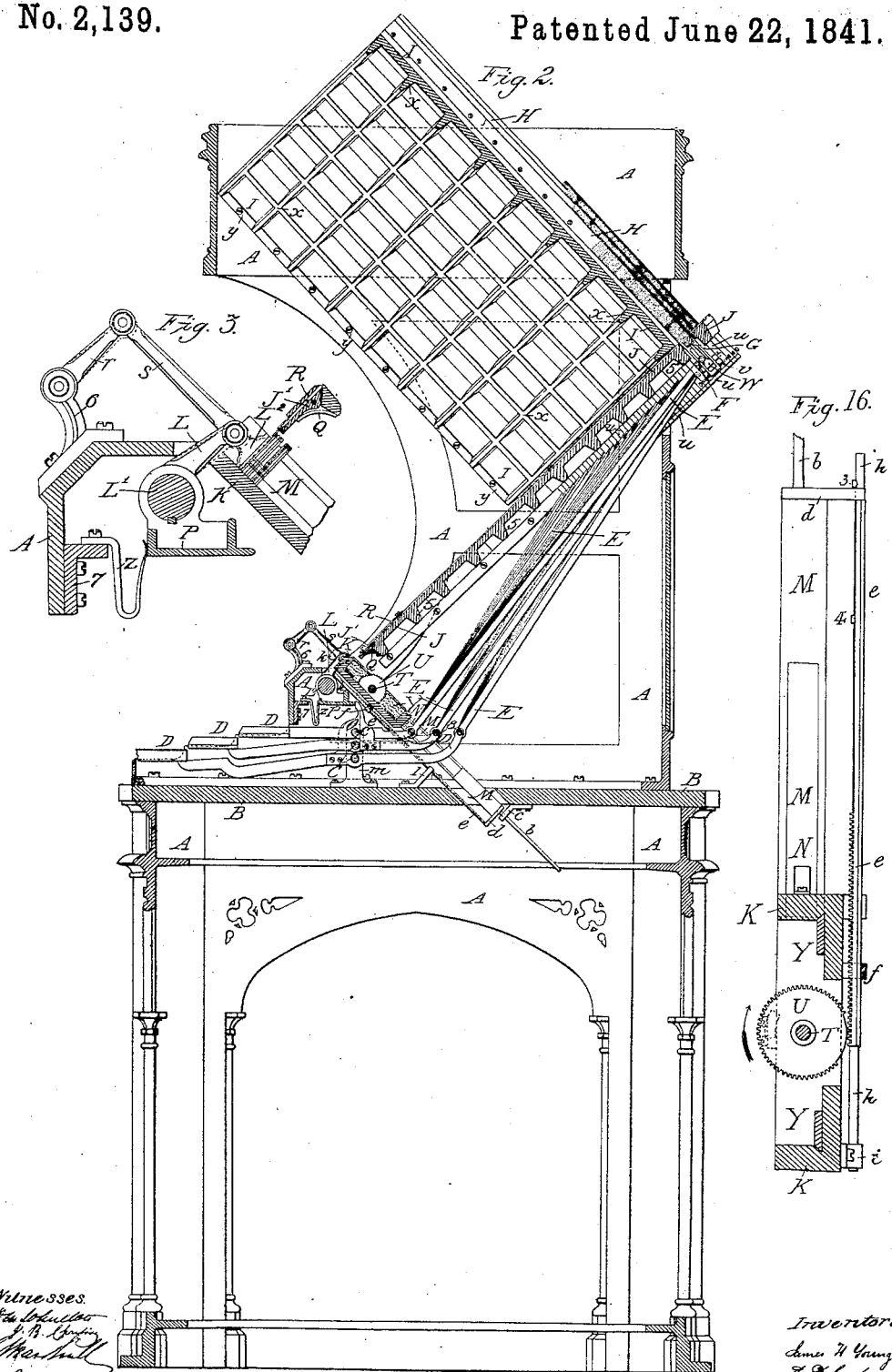

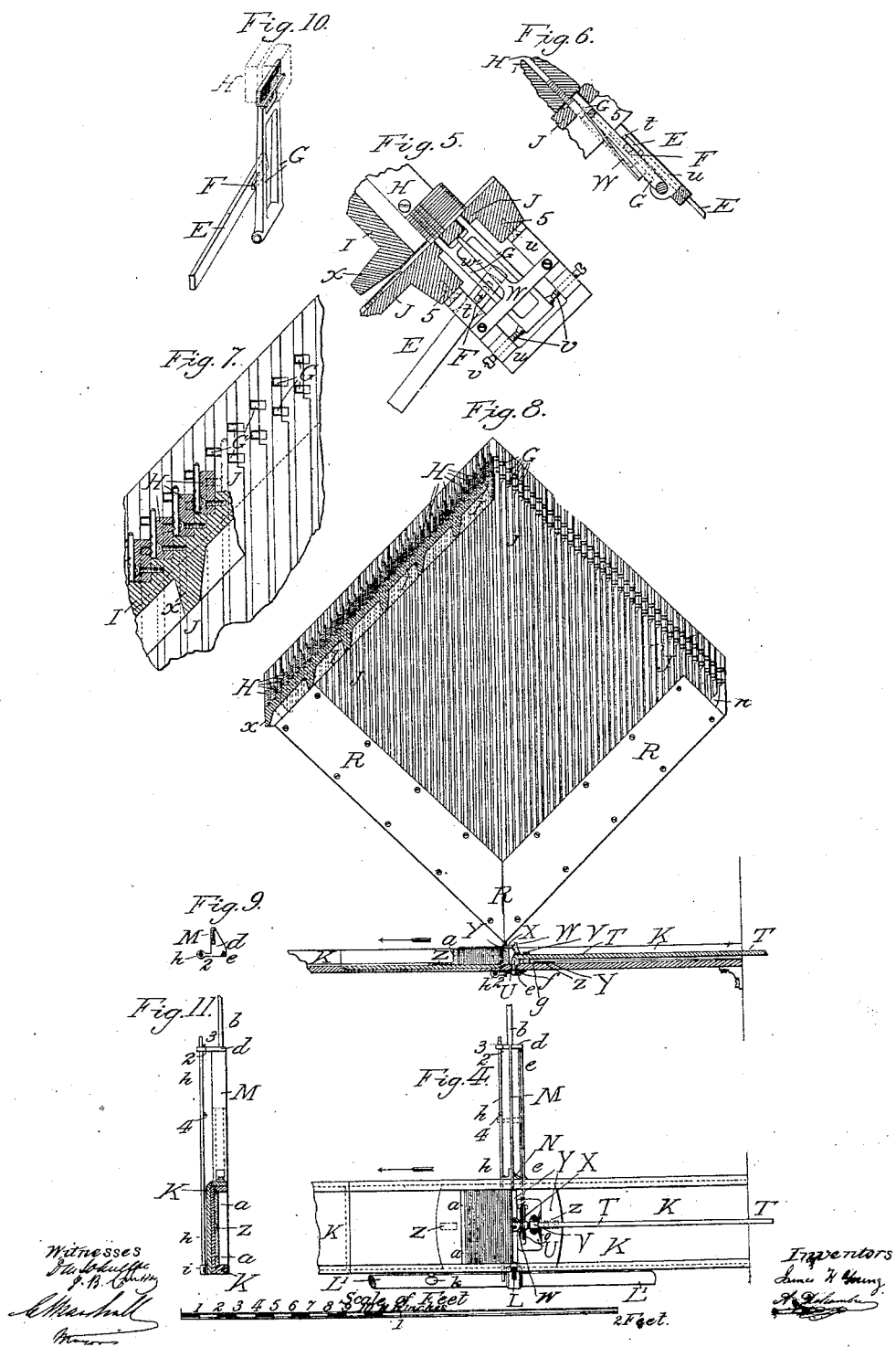

5 Sheets—Sheet 4.
J. H. YOUNG & A. DELCAMBRE.
TYPE SETTER.
No. 2,139.                  Patented June 22, 1841.
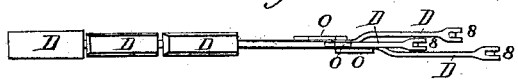
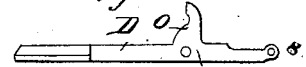
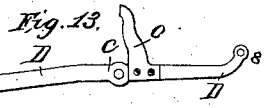
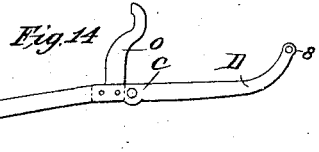
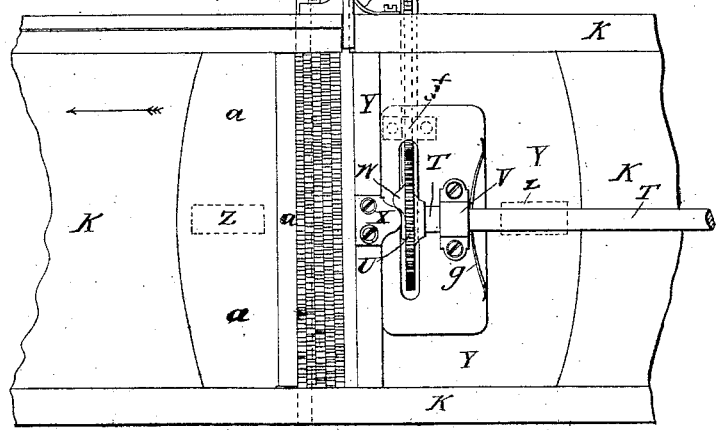

J. H. YOUNG & A. DELCAMBRE.
TYPE SETTER.

No. 2,139.  Patented June 22, 1841.

Witnesses.

Inventors.

UNITED STATES PATENT OFFICE.

ADRIEN DELCAMBRE AND JAMES HADDEN YOUNG, OF LISLE, FRANCE.

MACHINE FOR SETTING TYPE.

Specification of Letters Patent No. 2,139, dated June 22, 1841.

*To all whom it may concern:*

Be it known that we, ADRIEN DELCAMBRE, a subject of the King of France, residing at Lisle, in the Kingdom of France, merchant, and JAMES HADDEN YOUNG, a subject of the Queen of Great Britain, also residing at Lisle aforesaid, merchant, have invented or discovered an Improved Mode of Setting Up Printing-Types; and we, the said JAMES HADDEN YOUNG and ADRIEN DELCAMBRE, do hereby declare that the nature of our invention and the manner of carrying the same into effect is particularly described and ascertained in and by the following statement thereof, reference being had to the drawings hereunto annexed and to the figures and letters marked thereon—that is to say, The invention consists of a machine or apparatus for composing or what is technically called "setting up" types for the purposes of printing by which we are enabled to place the letters in their proper places as in the composing stick in a much more rapid manner than heretofore by means of an inclined plane or inclined planes upon which the types are thrown and allowed to descend by various channels meeting in one point to what we call the composing box which supplies the place of the composing stick.

The machine consists of a number of keys somewhat similar to those of a piano forte which act upon levers which push the types on to the inclined plane or planes aforesaid and bring them down by their own gravity to the said box whenever the keys are depressed, such types being so pushed out of open boxes or cases made to contain them. In this composing box as in the ordinary composing sticks the types are arranged side by side and from thence they are removed by hand to be placed in the chases ready for printing.

The machine as represented in the drawing is arranged for "setting up" seventy-six different letters or spaces merely for the purpose of explaining the movements of the various parts but in a machine suitable for composing type in the ordinary way the same number of cases or partitions would be required as is provided in the "case" used in printing offices.

*Description of the drawings.*—In the drawings hereto annexed Figure 1 is a front elevation of the machine with some of the casing removed to show the mechanism more distinctly. Fig. 2 is a vertical side section of the same and similar letters are used to denote similar parts in all the figures.

A A A is the casing or frame work of the machine in the middle of which is a horizontal bed plate B to which is attached bearings $m$ which carry the pins C forming axes for keys like piano keys, D, D, D, to vibrate upon, three rows of which are shown in the drawing and colored brown, pink and green to distinguish them. The ends of the keys are connected by joints to the bottom of the inclined levers or rods E, E, E, the form of which is shown in Figs. 1 and 2 on the upper part of which levers are fixed inclined planes or wedges F, F, as will be seen in Figs. 5, 10, 20 and 21. These wedges act against the pushing frames G, G, whenever a key is depressed by the lever being forced upward in the direction of the arrow as in Figs. 5, 10, 20, 21 and 22, which will cause the wedges or inclined planes to pass over the surface of the pushing frames from the bottom to the higher part and thus force out the pushing frames from it and the upper ends 10 of the pushing frames coming against one of the types will force that out also. The types are placed one above the other in open channels or cases H, H, which consist of brass bars placed parallel to each other and raised one above the other as seen in Fig. 1 to correspond with the inclination of the back of the inclined plane J and they are left sufficiently wide apart to allow the column of types to slide down freely as a type is removed at bottom of the column by the pushing-frame; for this purpose they are mounted as in Fig. 2 in an inclined position upon a frame work I which is at right angles to the inclined plane J. This frame work, as will be seen in Fig. 1, is in the form of a pointed roof and is strengthened on the underside by cross ribs $x$, $x$, cast upon it for the purpose of supporting the whole weight of the types; it is also firmly attached to the frame work A A by screws at $y$, $y$. The upper side of the frame work I is cast with steps upon it and to each of these steps is screwed one of the brass bars H which form the channels or cases and will be better understood by reference to Figs. 1, 7 and 8. The upper ends of the levers E pass through slots $t$, cut in one side of the supports $u$. These supports are screwed at 11, see Figs. 5 and 22, to the underside of the inclined plane J and are for the purpose of supporting one end of the levers E, as also to form bearings in which the pushing frames vibrate.

$v, v$, are center screws passing through the supports and the points of which form centers for the pushing frames to vibrate upon; to the supports $u$ are fixed by screws springs $w$ the points of which act against the pushing frames G in an opposite direction to the inclined planes or wedges F and force back the frames to their former position as the wedges recede from the faces of the frames, which is caused by the gravity of the levers E and consequently bringing back the keys D to their former position.

On referring to Figs. 18, 19, 22 it will be seen that the ends 10 of the pushing frames pass through holes in the inclined plane J, and project so much above it as the thickness of the type which is to be removed from the cases H. The whole column of types in the cases rest upon the inclined plane J, and when the key is depressed and the pushing frame acted upon by the wedge or inclined plane F, as already described the ends of the pushing frame will force out the bottom type from the column of type above into the position shown in Figs. 10, 18, 19 where being freed from the weight of the column it will slide down the grooves of the inclined plane as shown in Fig. 18 the ends of the pushing frames will now be partly under the column of type for they are so arranged as not to be pushed beyond it and as soon as the finger is removed from the key the spring $w$, fixed to the supports $u$, will force back the ends of the pushing frames to the position shown in Figs 6 and 18 where it rests until again acted upon—the column of type will now wholly drop down onto the inclined plane J, and the next type above that just removed will occupy its place in front of the pushing frame ends 10 so that at each depression of a key the pushing frame will remove the bottom type of the column from the case to which it belongs there being a key D,—lever E—and inclined plane F—support $u$—pushing frame G and spring $w$ to each case of type.

J, is a grooved plate also placed in an inclined position and forms the inclined plane hereinafter alluded to as one of the principal features of our said invention see Fig. 2. It is provided with strengthening ribs 5, see Figs. 2 and 5. This grooved inclined plane receives the types immediately after they are removed out of the cases (there being a groove to each type) and as soon as the lower type of the column is pushed out of its case it slides down the inclined plane and is conveyed by the cross channels $n, n$, see Fig. 1 to the setting up or composing box K at the point J, this box serves the purpose of the ordinary composing stick and receives the whole of the type while it is being formed into pages or sentences.

The form of the composing box will be seen in Figs. 16, 17, which are views of it of the full size and Fig. 23 is also a perspective section of it to show it more distinctly— it consists of two sides and a bottom cast in one piece and extending across the whole width of the machine the end being open— in each of the sides is a dovetailed groove extending from end to end in which grooves the feathered edges of the slides Y and $a$, can work to and fro and keep them steady. On one side of the box an opening 13 is made see Figs. 4, 17 and 23 to allow the lever L or what we call a beater to vibrate through at each depression of a key and a similar opening 14 is also made on the opposite side for the slide M to work through. On referring to Fig. 23 it will be seen that a portion of the bottom and one of the sides of the box is made to draw out by a handle $k$, this part also works in dovetailed grooves and is sufficiently long to hold a page of type.

The box K is fastened to the frame work A at each end by screws.

L is a small lever or arm which is fixed to a vibrating spindle L′ extending across the machine and mounted upon pivots at each end connected by a joint to the lever $s$ of the parallel motion $r$, which is fixed by a bracket $b$ to the framing A and at every depression of a key the lever or beater L vibrates and the end $L^2$ of the parallel bar $s$ passes through an opening 13 in the side of the box K and comes in contact with the line of type which is being formed and pushes it away from the point J′, of the inclined plane as shown by red lines in the detached Fig. 3 so that another type may fall into the space caused by this movement and the opposite end of the line is supported upon a brass slide M which also recedes with the type at every stroke of the lever through a notch or opening 14 in the opposite side of the box and is prevented from slipping too far by the pressure of a spring N against it which causes the slide to move only so far as it is pushed by the lever. The lever or beater L receives its motion from vertical arms O, O, O, one of which is fixed to each key and which arms are shown with the keys detached in Figs. 12, 13 and 14 and as soon as the depression of the key takes place its arm O presses upon the edge of the bar P which is also fixed to the spindle L′ and forces the lever L through the notch or opening 13 in the side of the box K and its end $L^2$ against the type which has just dropped from the inclined plane J.

F, is a spring attached at one end to the framing A by a bracket 7, and its opposite end presses against one side of the bar P, in an opposite direction to the arms O, to bring the lever L and its end L² into its former position after it has forced the type away from the point J', of the inclined plane and thus to leave a space for the next type to fall into the box this will be better seen in Figs. 2 and 3 but in order to guard against the breaking of a type should it stick in the channel J' that part of the channel is made to move on a hinge and is supported upon a spring Q and thus allows the type when pressed upon by the shoulder L² Fig. 3 of the parallel lever s to yield or recede till the pressure is removed when it drops into the box K.

R is a covering plate shown in Figs. 2 and 8 (but partly removed in Fig. 1) to prevent the types from jumping out of the cross grooves n, should they fall too rapidly.

In Fig. 2 a line of type is shown as having been just completed in the box K and the slide M as projected to its full extent out of the box this will also be clearly seen by reference to Fig. 4 which is a plan of the box detached from the machine. As soon as the line of type is filled it is necessary to move it sidewise to make room for the next line to be placed in the box K this is effected in the following manner—At one end of the machine is a handle and wheel S (shown in Fig. 1) one revolution of which will move the type sufficiently for the next line. This wheel is fixed to a shaft T which at its opposite end carries a toothed wheel U and is mounted in a bearing V in the bottom of the box K on the face of the toothed wheel is a cam W projecting from it as much as the width of the type which acts upon a stud X fixed to the brass slide Y which moves in dovetailed grooves in the box K and has a spring Z on its under side (shown by dots) for the purpose of making it move stiffly. This slide Y as will be seen in Fig. 4 supports the type on one side and on the other is a similar acting slide a, which also supports the type this is also provided with a spring Z underneath to prevent it giving way to the action of the cam too easily. The brass slide M which moves through a notch in the side of the box has a guide pin b at one end passing through a bearing C (see Fig. 2) fixed to the bed plate B of the machine for the purpose of keeping its motion steady at this end also is an arm d connecting it with a toothed rack e, which gears with the wheel U and passes through a bearing f, on the underside of the box and also through a bearing 1 fixed to the upper side of the bed plate B it will now be evident that when the workman turns the handle S the cam W will act upon the stud X of the slide Y and force it back in the direction of the arrow as well as the several lines of type in the box and the slide a on the other side of the type also, when as soon as the cam has left the stud a spring g, fixed to the bearing V will force back the slide to its former position the teeth of the wheel U will now move the rack e, and bring into the box the slide M (for the wheel U it will be seen on referring to Figs. 2 and 16 has a portion of its surface without teeth) so that swile the cam is moving the slides Y, a, and the types it shall not move the rack and slide M. In order that the workman may know when a line of type is filled there is a rod h, (seen in Figs. 1, 2 and 4) which passes through a loop r and bearing 1. And 2 is an arm with an eye extending from one side of the slide M and as the slide recedes from the box the eye of the arm comes in contact with the stud 3, and brings the point of the rod h, within the loop i, which will indicate that the line is complete and as the slide M is brought again into the box by the rack and pinion the eye of the arm will come in contact with the stud 4 and thus bring the point of the rod out of the loop to its former position.

That part of the box K where the page of type is composed or set up is made to slide in dovetailed grooves see Figs. 1 and 23 and as soon as a page is complete the workman withdraws that part of the box by means of a handle K and along with it the whole of the type so that it may be placed in the chase for printing.

Figs. 5, 6, 7 and 10 are detached portions of the machine of the full size showing the movement of the lever and wedge which as soon as a key is depressed detaches the type from the boxes H the action in Fig. 6 being shown by red lines.

Fig. 8 is a plan of the inclined plane J and at one side is a section of some of the boxes or cases H with the types therein—a longitudinal section of the composing box K is also shown in this figure.

Figure 18:
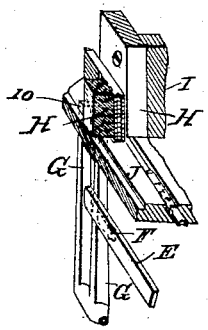
Figure 19:
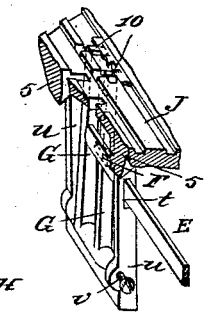
Figures 20, 21:
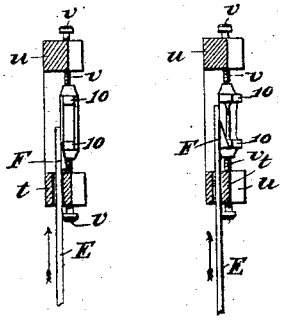
Figure 22:
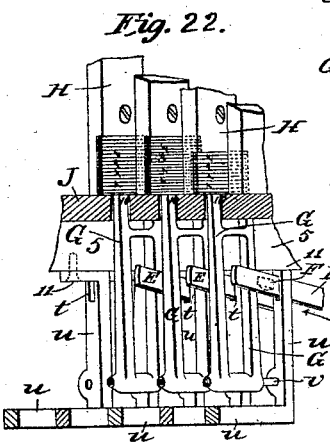
Figure 23:
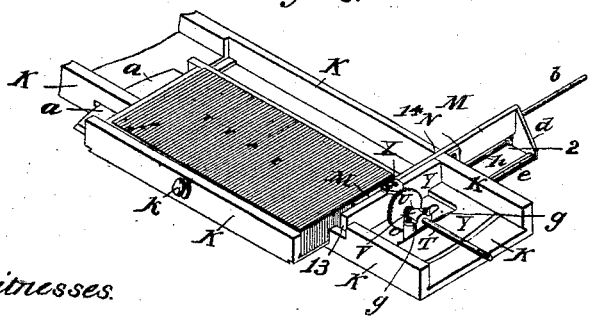

Fig. 9 is a transverse section showing the form of the arm d, slide M rack e, and arm and eye 2 and Fig. 11 is a transverse section of the box K showing the side elevation of the slide M and rod h, projected from the box to their full extent. In order that the workman may be guided in his operation of the machine and that wrong letters may not be brought into the box we have marked upon each key the letter to which its case H is connected and the cases should also be marked with similar letters that the persons employed to fill or charge them may not insert the wrong letters therein.

Figs. 12, 13 and 14 are side elevations of the keys D detached from the machine showing the form of the vertical arms O.

Fig. 15 is a plan of the keys D showing the joints 8 to which the levers E are connected.

Fig. 16 is a transverse section through the box K of the full size with the slide M projected out of the box the arrow indicating the direction in which the cog wheel U is moving so as to bring the slide M into the box by means of the rack e, and Fig. 17 is a plan of the same.

Should the machine be extended in the number of its keys and cases of type it will of course be necessary to increase in a similar proportion the number of grooves in the inclined plane J but these grooves should be so arranged that the length of the parallel grooves combined with the cross channels should be so much shorter as to compensate for the differences in the time the types would be sliding down into the box so that the letters should fall in the same order of time in which the keys are struck.

Having now described the various parts of the apparatus and the mode of operating with the same we hereby declare the inclined plane, the pushing frame, the covering plate, our new composing box and the movements connected with the said box to constitute our said invention for which we hereby claim to maintain exclusive right and privilege by means of Letters Patent.

ADRIEN DELCAMBRE.
JAMES H. YOUNG.

Witnesses to the signature of A. Delcambre:
EDMOND MOREL,
AV. DASENBERGH.

Witnesses to the signature of James Hadden Young:
J. RAMSEY,
P. IAGELS.